Feb. 23, 1926.
F. VINCENT
STEERING WHEEL
Filed Dec. 20, 1921
1,574,321
2 Sheets-Sheet 2
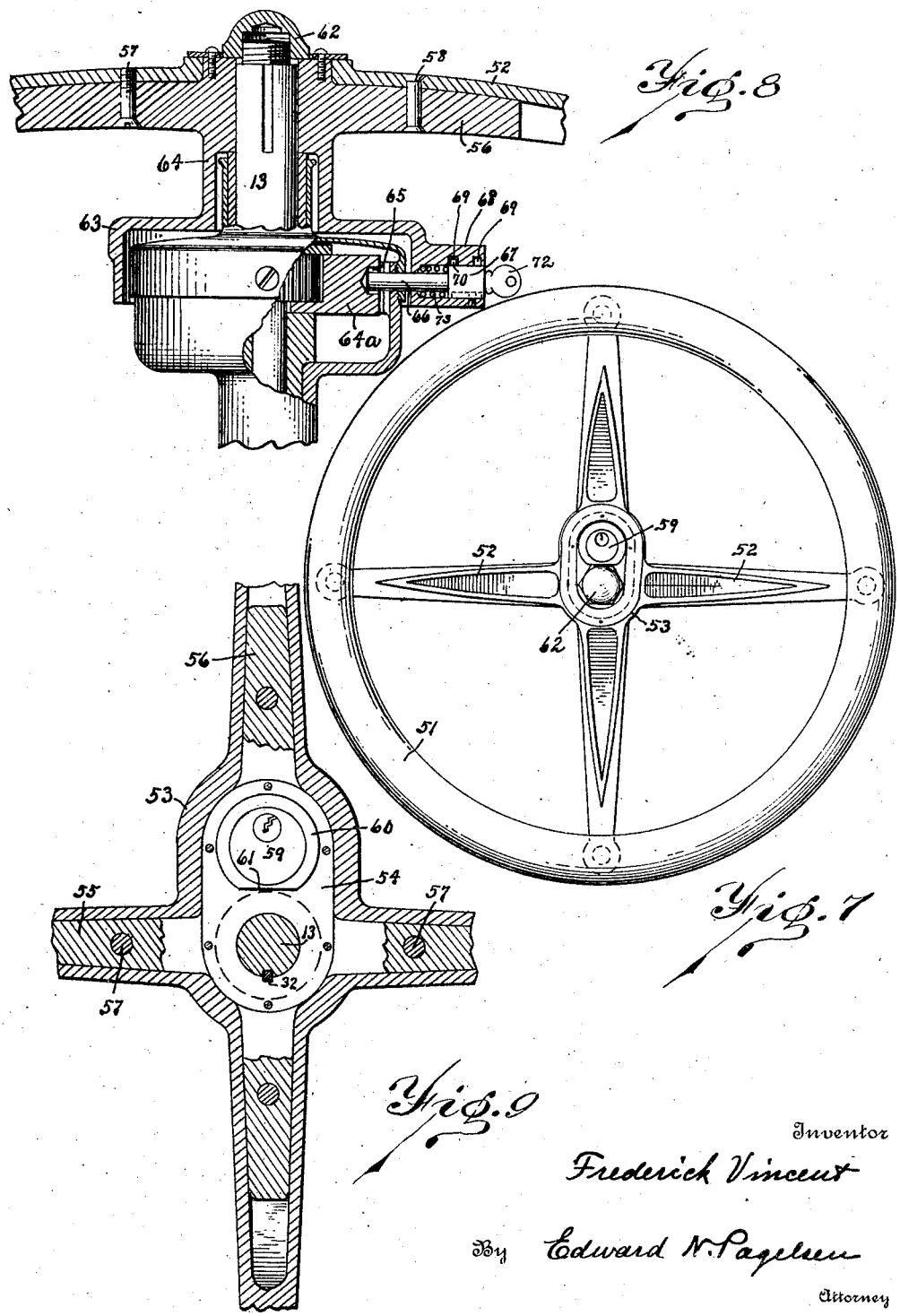
Inventor
Frederick Vincent
By Edward N. Pagelsen
Attorney Patented Feb. 23, 1926.

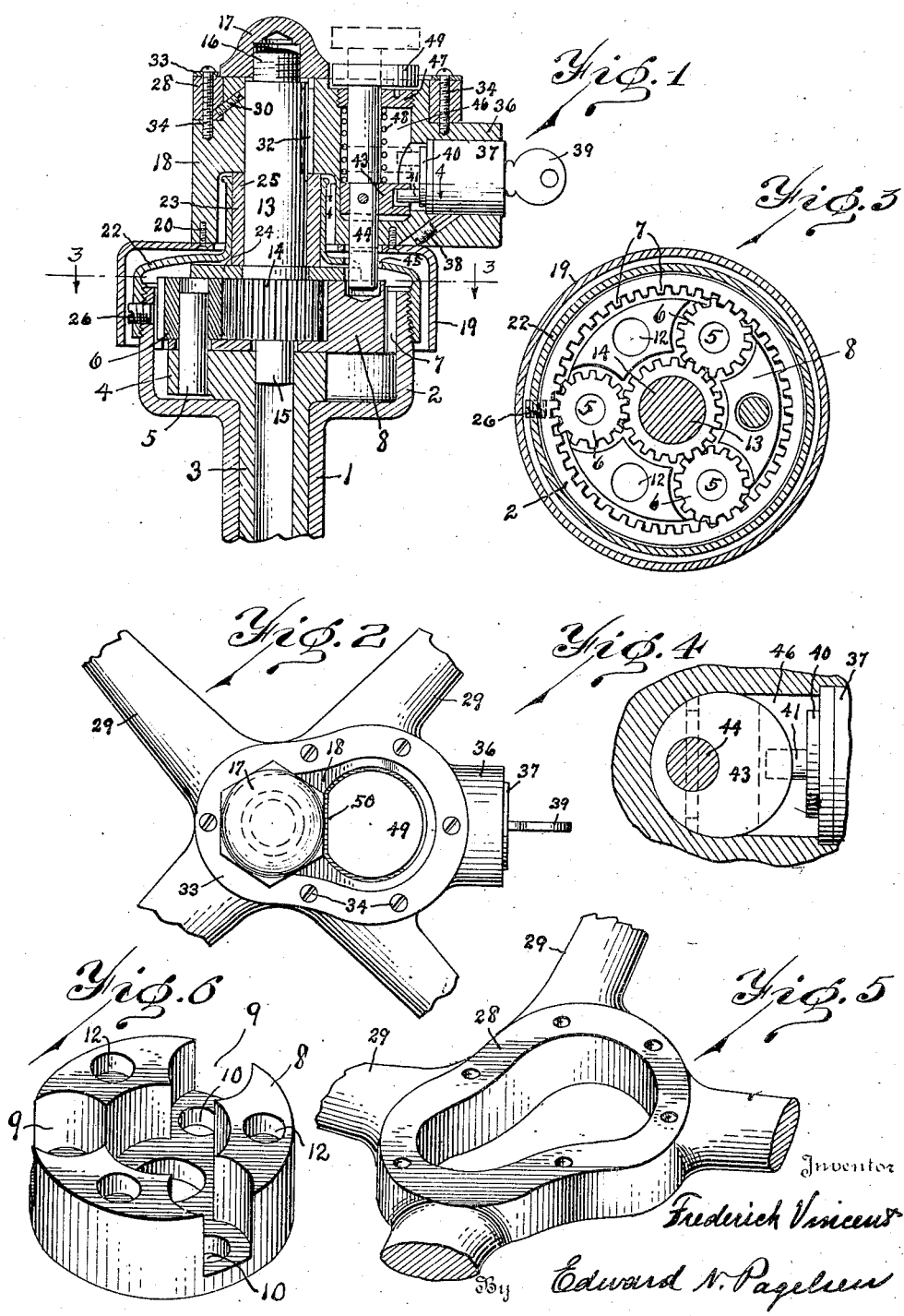

1,574,321

UNITED STATES PATENT OFFICE.

FREDERICK VINCENT, OF DETROIT, MICHIGAN.

STEERING WHEEL.

Application filed December 20, 1921. Serial No. 523,698.

*To all whom it may concern:*

Be it known that I, FREDERICK VINCENT, a citizen of the United States, and residing at Detroit, in the county of Wayne and State of Michigan, have invented a new and Improved Steering Wheel, of which the following is a specification.

This invention relates to steering wheels adapted for use in connection with the Ford type of steering mechanisms, that is, motor vehicles in which the steering shaft is in two parts connected by a speed reducing mechanism mounted in a casing at the upper end of the steering post and the steering wheel is attached to one of said parts, and its object is to provide a structure of this character in which the steering wheel may be locked to said casing to prevent the wheel and the other parts of the shaft from turning, the locking means being made of hardened steel so that it is impossible to disengage the lock except after prolonged labor.

This invention consists in a main steering shaft mounted in the usual steering post of the vehicle, a casing at the upper end of the post, a stub shaft, a steering wheel thereon, a casing or hub extending down from the steering wheel and embodying a cap for the gear casing, the hub and cap being of hardened steel, gears connecting the shafts, and means controlled by a key operated lock mounted in this extension on the steering wheel and embodying a bolt adapted to extend into the casing to prevent the actuation of the main shaft by the stub shaft.

This invention further consists in the details of construction illustrated in the accompanying drawings and particularly pointed out in the claims.

In the accompanying drawings, Fig. 1 is a central vertical section of a steering mechanism embodying this present invention. Fig. 2 is a plan of the same. Fig. 3 is a section on the line 3—3 of Fig. 1. Fig. 4 is a section on the line 4—4 of Fig. 1. Fig. 5 is a perspective of the adjacent inner ends of the arms of the steering wheel together with a hub ring connecting them. Fig. 6 is a locking member adapted to be mounted within the gear casing. Fig. 7 is a plan of a modified form of wheel. Fig. 8 is a vertical section of still another modification. Fig. 9 is a horizontal section of the structure shown in Fig. 7.

Similar reference characters refer to like parts throughout the several views.

It has been found that the so-called locking steering wheels are ineffective to prevent the theft of motor vehicles for the reason that the thieves are able to form connections between free spinning wheels and the steering shafts by driving wedges into the spaces between the wheel proper and the bushings or heads attached to the upper ends of the steering shafts. These safety wheels which are provided with positive locks to prevent them from turning on the steering columns are also rendered ineffective by simply sawing out these locks.

The object of the present invention is to provide a lock of the second type, that is, one which prevents the rotation of the steering wheel relative to the steering column, which locking device embodies a hardened steel portion which encloses the lock so that the steering mechanism is absolutely ruined by the breaking of the lock.

In Figs. 1 to 6 inclusive I have shown the upper end of the steering column 1 provided with the usual gear casing 2 and within the column and casing is the main steering shaft 3 provided with a head 4 which carries the pins 5, preferably three in number. Loosely mounted on these pins 5 are the pinions 6 which mesh with the internal teeth 7 formed in the upper end of the casing 2. This structure is well known.

In the present case I have mounted a cylindrical block 8 having recesses 9 to receive these pinions 6 concentric with the shaft 3 so as to rest on the head 4, and this block is formed with holes 10 to receive the pins 5. This block is also formed with shallow recesses 12 to receive the locking bolt to be hereafter described.

A stub shaft 13 has a pinion 14 mounted or formed thereon to mesh with the pinion 6 and which has an extension 15 to fit into the bore of the main shaft 3 and so keep them in alinement. Its upper end 16 is threaded to receive the nut 17 which holds the steering wheel in position. This steering wheel has a hub 18 of very hard material, preferably hardened steel, and to this hub is attached a cap 19 by means of screws 20. This cap is also preferably formed of hard steel. A cover 22 of ordinary construction screws onto the gear casing 2 and has a neck 23 which extends up into the hub 18. A washer 24 rests on the block 8 and supports a sleeve 25 on which the hub 18 is mounted. As illustrated in Fig. 1, this washer 24 is of smaller internal diameter than the pinion 14 which is integral with the shaft 13, and therefore so long as the cover 22 is in position, this shaft cannot be lifted and the wheel hub 18 cannot be lifted so long as the nut 17 is in position. The cover 22 is kept from unscrewing by means of a screw 26. The block 8 and the nut 17 are also of hardened steel.

The upper end of the hub 18 is formed with a circumferential recess to receive the ring 28 from which the arms 29 of the wheel extend. Any desired number of screws 30 extend from the bore of the hub which receives the shaft into this ring 28 and prevent it from being removed except when the hub is entirely off this shaft 13. A key 32 connects the hub 18 to the stub shaft 13. A finishing strip 33 may be attached to the hub 18 and the ring 28 by means of the screws 34, if desired.

An extension 36 on the hub 18 has a horizontal bore to receive the lock barrel 37 which is held in place by means of a screw 38 which can only be removed when the cap 19 is taken off. Within this lock barrel is a locking mechanism, not shown, operated by means of a key 39, and which connects to a disk 40 from which a pin 41 extends inwardly, this pin extending into a notch in a disk 43 attached to a locking pin 44 which normally extends down through a hole 45 in the cover 22. When in its depressed position, this pin enters one of the recesses 12 in the block 8, but when in its elevated position permits this block 8 to rotate freely. The hub is provided with a recess 46 in which this disk 43 is vertically movable and the upper end of this recess is closed by means of a screw-threaded disk 47. Within the recess and on the locking bolt 44 is a spring 48 which normally presses the locking bolt downward. The upper end of the locking bolt has a head 49 which has a flat side 50, as indicated in Fig. 2, so that when depressed this flat side will prevent the rotation of the nut 17. It will be understood that, after the manner of the usual Yale locks, the pin 41 of the lock will be in the position shown in solid lines in Fig. 1 at all times when there is no key in the lock, during which times the steering wheel is prevented from rotation. But when the key is inserted and the pin 41 is moved to the position shown in dotted lines, thereby elevating the locking bolt 44 and its head 49, the nut 17 is released and can be unscrewed, the finishing strip 33 being first removed in order to free this nut.

Any desired number of holes 45 will be made in the cover 22 of the gear case and I prefer to have three holes 12 in the member 8. As the rotation of the head 4 of the main steering shaft and therefore of the member 8 is very much slower than that of the stub shaft 13 and of the steering wheel hub, the locking pin 44 when in the position shown in solid lines in Fig. 1 will absolutely prevent the rotation of the steering wheel. The steering wheel arms 29 and the ring 28 connected thereto may be made of soft metal such as aluminum and may be destroyed without affecting the lock. After the key 39 is withdrawn with the locking bolt 44 in operative position, it cannot be released except by destroying the hub 18, which would render the steering mechanism entirely useless.

In Figs. 7, 8 and 9, two modifications are shown. The structure shown in Figs. 7 and 9 embodies a steering wheel 51 having arms 52 which connect by means of an elliptical ring 53. These arms are U-shaped in cross section and fitting into them is a hub member 54 having arms 55 and 56 which may be secured to the arms 52 by means of screws 57 or rivets 58, or both. The lock 59 is mounted in this hub 54 and is so formed that it may move up or down, and it has a locking bolt extending down parallel to the stub shaft 13. This construction can be designed by any lock maker, but is clearly shown in my prior application Serial Number 479,627 filed June 22, 1921. The lock barrel has a flange 60 provided with a flat side 61 which is adapted to prevent the rotation of the nut 62. The hub 54 and its arms 55 and 56 are again of hardened steel, so that while the arms 52 of the steering wheel may be broken therefrom, the lock will still prevent the rotation of the stub shaft and the steering of the vehicle.

Instead of having the cap 19 secured to the hub, as indicated in Fig. 1, I have shown the cap 63 made integral with the hub 64 in Fig. 8. The same stub shaft 13 is employed, but in place of the member 8 I have shown a disk 64ª formed with recesses 65 in its circumference to receive the locking pin 66 of the lock 67. The extension 68 on the hub is formed with recesses 69 to receive the small pin 70 which is moved in or out by means of the key 72 and the position of this pin 70 in the small recesses 69 will determine whether the locking bolt 66 shall be in a recess 65 or withdrawn therefrom. There may be any number of these recesses. The spring 73 will normally force the locking bolt 66 into inoperative position whenever the key 72 is turned to withdraw the pin 70.

The other details shown in Figs. 7, 8 and 9 will be similar to those in Figs. 1 to 6 inclusive.

The details of construction and the proportions of the parts of this locking mechanism for steering wheels may all be changed by those skilled in the art without departing from the spirit of my invention as set forth in the following claims.

I claim:—

1. In a steering mechanism, a main rotatable steering shaft, a casing therefor having an internal circular rack, planetary gears carried by said main shaft and meshing with the rack, a member rotatable with and carried by the main shaft, a shaft section having a pinion meshing with and driving the planetary gears, said shaft section carrying a steering wheel structure including locking means adapted to have engagement with said member to prevent rotation of said shafts and planetary gears.

2. In a steering mechanism, a steering shaft projecting into a casing therefor, a steering wheel hub removably mounted on the upper end of said shaft, a cap removably fitted on the upper end of the casing and preventing removal of said shaft from the casing, a removable member to secure the cap to the casing, a removable cover rotatably attached to the shaft to prevent access to and removal of said cap and said member from the casing, and locking means arranged to prevent removal of the cover from the cap, said locking means also adapted to prevent rotation of the shaft relative to the casing and simultaneously prevent removal of the wheel hub from the shaft.

3. In a steering mechanism, a steering shaft projecting into a casing therefor, a steering wheel hub removably mounted on the upper end of said shaft, a cap removably fitted on the upper end of the casing and preventing removal of said shaft from the casing, a removable screw having engagement with the cap and casing to prevent removal of the cap from the casing, a cover removably attached to the wheel hub and encompassing said cap to prevent access to and removal of said cap and said screw from the casing, and locking means arranged to prevent removal of the wheel hub from the shaft, said locking means also adapted to prevent rotation of said wheel hub and said shaft relative to the casing, said cover being removable from said wheel hub after said hub is removed from said shaft.

4. The combination of a steering column, a main steering shaft therein having a head at its upper end, a casing at the upper end of the column having a ring of internal teeth, pins carried by said head, pinions mounted on said pins and meshing with said internal teeth, a stub shaft in alinement with but separate from said main shaft and having a gear between and meshing with said pinions, a cap for said gear casing and means to hold the cap from being unscrewed, a hardened steel wheel hub secured to said stub shaft, a cover secured to the lower side of said hub and extended over said cap to prevent access thereto, a steering wheel attached to said hub, a locking bolt mounted in said hub and adapted to move parallel to said stub shaft, a cylindrical member within the gear case formed with pockets to receive the pinions therein and the gear on the stub shaft and with recesses to receive the locking bolt, and a key operated lock mounted in said hub and provided with means to move said locking bolt into and out of the recesses in said cylindrical member.

5. In a steering mechanism, a steering shaft, a casing therefor, a cap removably fitted on the upper end of the casing, a steering wheel embodying a head carried by said shaft, a shell encompassing and covering said cap to prevent removal of said cap from said casing, a removable member having engagement with said cap and casing to prevent removal of the cap from the casing, said shell being carried by said head, said cap being removable from the casing after said member is disengaged from the casing, and locking means to prevent removal of the shell and head from the cap.

6. In a steering mechanism, a steering shaft, a casing therefor, a cap removably fitted on the upper end of the casing, a member having engagement with said cap and casing to prevent removal of the cap from the casing, a steering wheel carried by the shaft, said wheel embodying a cover encompassing and covering said cap to prevent removal of said cap and member from said casing, and a key operated lock adapted to allow or prevent removal of the steering wheel from the shaft.

7. In a steering mechanism, a casing, a removable cap secured thereon, a steering shaft projecting into the casing, a cover of hardened metal extending over the cap to prevent access to said cap, and a steering wheel having a hub of hardened metal arranged to prevent the cover from being lifted from the cap, said cover having an opening and being rigidly fastened to and extending below the lower surface of said hub, said cap having a neck encompassing said shaft, said neck adapted to extend through the opening in said cover, and locking means to prevent removal of the cover from the cap.

8. In a steering mechanism, a casing, a removable cap secured thereon, a steering shaft projecting into the casing, a cover extending over the cap to prevent access to said cap, and a steering wheel carried by said shaft and arranged to prevent the cover from being lifted from the cap, key-operated locking means carried by said steering wheel to prevent removal of said steering wheel from said shaft, said cover being carried by said wheel.

9. In a steering mechanism, a casing, a removable cap secured thereon, a steering shaft projecting into the casing, a steering wheel secured to the shaft and having a circumferential flange extending over the cap, said wheel and flange being arranged to prevent the removal of the cap from the casing, and locking means mounted in said steering wheel to permit or prevent removal of said wheel and flange relative to the casing.

10. In a steering mechanism, a casing, a steering shaft projecting into said casing and removable from said casing, a steering wheel hub removably mounted on said shaft, a cap removably fitted on said casing and preventing removal of said shaft from the casing, a cover removably carried by said wheel hub and encompassing said cap to prevent removal of said cap from said casing, and locking means mounted in said wheel hub to control removal of said wheel hub from the shaft, said cover being removable from said wheel hub after said hub is removed from said shaft.

11. In a steering mechanism, a casing, a removable cap secured thereon, a steering shaft projecting into the casing, a steering wheel secured to the shaft, a removable cover encompassing said cap, said wheel and cover being arranged to prevent removal of the cap from the casing, and key operated locking means carried by the wheel to control removal of the wheel and cover relative to the casing.

12. In a steering mechanism, a rotatable steering shaft projecting into a casing therefor, a steering wheel to rotate said shaft, a cap removably fitted on the upper end of said casing and preventing removal of said shaft from the casing, removable means to secure the cap to the casing, a removable housing comprising a cover encircling and arranged to prevent removal of said cap and said removable means from said casing, and locking means carried by said housing and when in one position adapted to prevent removal of said cap, said housing and cover and said shaft and prevent rotation of said shaft relative to said casing, said locking means when in another position adapted to allow rotation of said shaft and removal of said shaft, said cap, and said housing and cover relative to the casing.

FREDERICK VINCENT.